Figure 1:
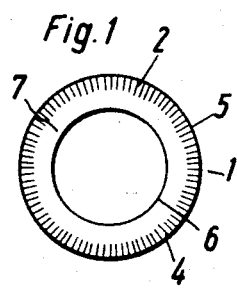

United States Patent [19]

Heinrich

[11] 3,744,805
[45] July 10, 1973

[54] SLIDE RING FOR AXIALLY ACTING SHAFT SEALING RINGS
[75] Inventor: Richard Heinrich, Heilbronn, Germany
[73] Assignee: Kupfer-Asbest-Co Gustav Bach, Heilbronn, Germany
[22] Filed: Aug. 2, 1971
[21] Appl. No.: 168,502

Related U.S. Application Data
[63] Continuation of Ser. No. 630,387, Jan. 4, 1969, abandoned.

[30] Foreign Application Priority Data
June 6, 1968 Germany.................. P 17 50 832.6
Aug. 30, 1968 Germany.................. P 17 75 596.3

[52] U.S. Cl.................................. 277/96, 277/133
[51] Int. Cl............................................. F16j 15/34
[58] Field of Search..................... 277/133, 134, 3, 277/96, 54

[56] References Cited
UNITED STATES PATENTS
3,085,808  4/1963  Williams............................. 277/3

FOREIGN PATENTS OR APPLICATIONS
888,198  1/1962  Great Britain..................... 277/134

Primary Examiner—George E. Lowrance
Assistant Examiner—Robert L. Smith
Attorney—Walter Becker

[57] ABSTRACT

A slide ring for axially acting shaft sealing rings which has an outer circumferential surface and an inner circumferential surface and furthermore is provided with a side face extending from the inner circumferential surface to the outer circumferential surface while forming a sliding surface for the ring, the sliding surface being provided with grooves distributed over an annular area on the sliding ring and extending at least toward one of said circumferential surfaces.

11 Claims, 21 Drawing Figures

PATENTED JUL 10 1973 3,744,805

SHEET 1 OF 2

Inventor:
Richard Heinrich

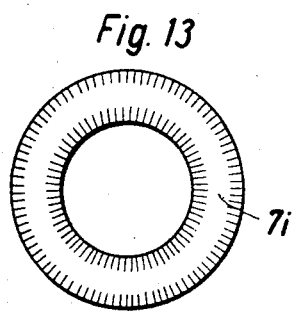
Fig. 13
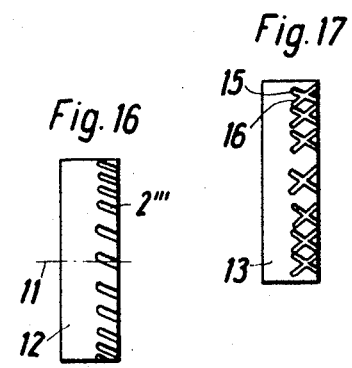
Fig. 16
Fig. 17
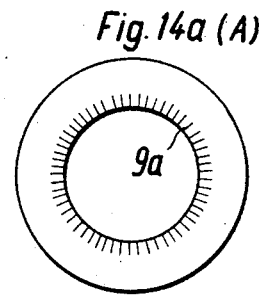
Fig. 14a (A)
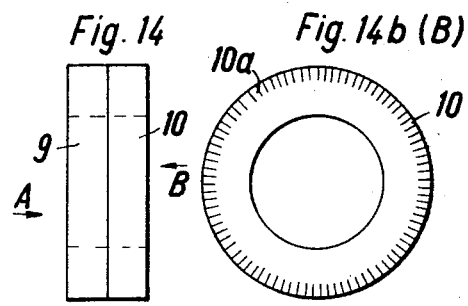
Fig. 14
Fig. 14b (B)
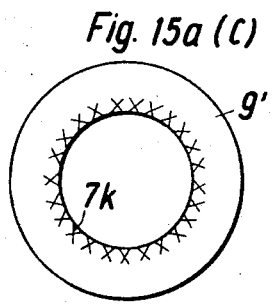
Fig. 15a (C)
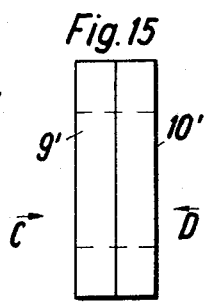
Fig. 15
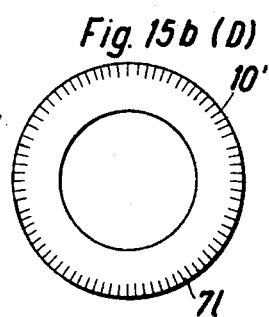
Fig. 15b (D)
Inventor:
Richard Heinrich

SLIDE RING FOR AXIALLY ACTING SHAFT SEALING RINGS

This application is a continuation of application Ser. No. 630,387 filed Jan. 4, 1969.

The present invention concerns a slide ring for axially acting shaft sealing rings with grooves on the sliding surface. A slide ring of this type may be employed as stationary counter race ring or as rotating race ring in slide ring seals. Slide ring seals for sealing rotating shafts are known which are provided, for instance, with a metallic housing having a rubber bellows which has vulcanized thereto an axially sealing side ring or in which the slide ring is connected to the rubber bellows in another way. The slide ring is by means of a spring pressed against the sealing surface of the counter race ring which sealing surface is perpendicular to the shaft. Such slide ring is frequently secured in the sealing housing against rotation and for purposes of absorbing the frictional moment. Such shaft seals are employed primarily in water pumps, washing machines, or the like.

When employing slide ring seals of the above mentioned type, it may occur that the slide ring and/or the counter race ring is subjected to vibrations which make themselves felt in a disadvantageous manner, for instance, by a high wear or by whistling. Furthermore, it is possible that with an insufficient lubrication the seal will prematurely fail.

It is, therefore, an object of the present invention to provide a slide ring of the above mentioned type or a counter race ring which will be so designed as to overcome the above outlined drawbacks of heretofore known slide rings and counter race rings.

This object and other objects and advantages of the invention will appear more clearly from the following specification in connection with the accompanying drawing, in which:

FIG. 1 diagrammatically illustrates a view of a slide ring according to the invention with grooves in the sliding surface.

FIGS. 2–9 illustrate similar to FIG. 1 a plurality of embodiments of slide rings according to the invention.

Figure 10:
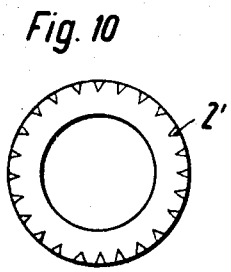
Figure 11:
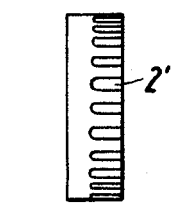

FIGS. 10 and 11 respectively illustrate in side view and end view a still further modified slide ring according to the invention with grooves (greatly enlarged) provided in the mantle surface.

Figure 12:
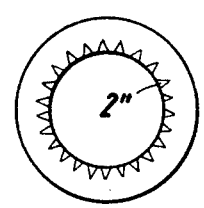

FIG. 12 is a side view of still another slide ring according to the invention.

FIGS. 13–17 illustrate additional modifications of a slide ring according to the invention. A slide ring for axially acting shaft sealing rings with grooves provided on the sliding surface is, in conformity with the present invention, characterized by annularly arranged grooves which are directed toward the circumference. This brings about a considerable improvement in the lubricating conditions so that vibrations or a premature wear of the slide ring will be avoided.

The grooves may, in a simple manner, be provided in the sliding surface. However, it is also possible in an advantageous manner to provide the grooves at an incline deviating from the radial arrangement shown in FIG. 1. If in this instance the grooves are not filled-in with another material, a twisting effect will be produced by the inclined grooves, and due to this twisting effect a kind of back-feeding effect of the medium to be sealed and thereby a better seal will be obtained.

For certain purposes it may be advantageous to have the grooves cross each other and, more specifically, to have the grooves so arranged that each two adjacent grooves cross each other. If in such an instance the two grooves crossing each other are arranged so as to extend in opposite direction and to deviate from the radial direction and if they are not filled-in, a back-feeding effect will be obtained in both directions of rotation.

According to a further development of the invention, the grooves extend to the outer circumference of the sliding surface. In this way, in the radial outer range of the sliding surface, a particularly good lubricating effect will be obtained. However, the grooves may also advantageously be extended to the inner circumference of the sliding surface. In both last mentioned instances, the sliding surface may for purposes of increasing the sealing effect, be provided with a groove-free annular zone. This groove-free annular zone may be provided radially outside the grooves. Furthermore, the groove-free zone may be provided radially within the grooves.

According to a further advantageous embodiment of the invention, the grooves may have a different length. This may, for instance, be effected in such a way that the outer and/or inner ends of the grooves are arranged on a circle or eccentrically with regard to the sliding surface.

For certain fields of employment it is advantageous to have the grooves filled at least partially, preferably by means of a lubricant. Such lubricant may be in the form of a liquid absorbing or liquid rejecting material which, for instance, has particularly good sliding properties. The lubricating substance may, in a simple manner, be placed into the grooves and may preferably be adhesively connected to the slide ring by glueing, vulcanizing or in any convenient manner.

The cross-section of the grooves may be triangular, trapezoidal, round or of another similar shape.

If desired, the grooves may also be arranged in the outer or inner mantle surface of the slide ring or race ring, however, in such a manner that they are open toward the sliding surface. In this connection they may be located at an angle or parallel to the axis of the ring and may be located parallel to each other or two grooves may in pairs cross each other. In this way a whirl formation is obtained by the medium to be sealed whereby soil particles are centrifuged away from the area of the sliding surface. A further advantage of this design is seen in the fact that also when the sliding surface is worn the way of action of the grooves is retained so that the lubricating effect remains effective during the entire time of operation. The grooves may be arranged and designed in a manner analogous to that of the previously described type of grooves, which means they may be helically arranged toward the left or toward the right or they may cross each other.

As a rule, either the sealing surface of the race ring or the sealing surface of the counter race ring is designed in conformity with the present invention. In many instances, however, it is advantageous to provide the sealing surfaces of both rings with grooves in conformity with the invention. In this connection it has proved particularly favorable when the grooves at the sealing surface of one ring extend from the outside to the inside and when the grooves at the sealing surface of the other ring extend from the inside toward the outside, which means that the grooves of one ring end in spaced relationship to the inner circumference of the sliding surface and the grooves of the other ring end in spaced relationship to the outer circumference of the sliding surface. However, also other combinations of the described sliding surface formation are possible.

An important advantage of the design of the slide ring of the present invention consists in that, independently of the conditions of operation, a uniform lubrication of the sliding sealing surfaces will be assured so that a maximum sealing effect and a maximum life of the slide ring seal will be obtained. In view of the permanent lubrication from the grooves, a continuous low frictional momentum prevails whereby a desired lower heat development is obtained. When eccentrically arranging the grooved zone of the sealing surface, the lubricant or the medium to be sealed is distributed over the entire sealing surface of the slide ring in an advantageous manner. Furthermore, it will be assured that disadvantageous vibrations of the slide ring during the operation will not occur. The described features are advantageously increased by the mentioned twist effect.

Referring now to the drawing in detail, the slide ring 1 according to FIG. 1 has its end sealing surface 4 provided with radially extending grooves 2 which are uniformly distributed over the circumference and extend to the outer circumference 5 of the sliding surface 4. The radially inner ends of grooves 2 are located in spaced relationship to the inner circumference 6 of the sliding surface 4 so that between the grooves and the inner circumference 6 there is formed a groove-free zone 7 the radial extension of which approximately equals that of the grooves 2. The distance between the grooves 2 corresponds approximately to two third of the length of the grooves.

Figure 2:
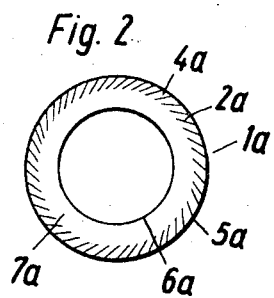

According to the embodiment of FIG. 2, all grooves 2a are arranged so as to deviate from the radial location and are provided on the sealing surface 4a at an incline while likewise extending up to the outer circumference 5a of the slide ring. The grooves 2a are so located in spaced relationship to the inner circumference 6a that a groove-free inner zone 7a is formed.

Figure 3:
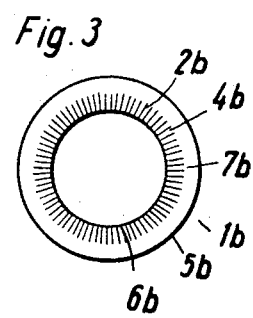

The embodiment of FIG. 3 differs from that of FIG. 1 primarily in that the grooves 2b are located on the annular sliding surface 4b and extend to the inner circumference 6b thereof. The radially outer ends of the grooves are located in spaced relationship to the outer circumference 5b so that between the outer circumference 5b and the annular zone comprising the grooves there is on the sliding surface 4b of sealing ring 1b formed a groove-free annular zone 7b.

Figure 4:
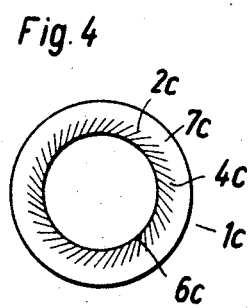

Similarly, the design of FIG. 4 differs from that of FIG. 2 primarily in that the grooves 2c the course of which differs from the radial course, are at the end face 4c of the slide ring 1c extended up to the inner circumference 6c in such a way that an outer groove-free annular zone 7c is formed.

Figure 5:
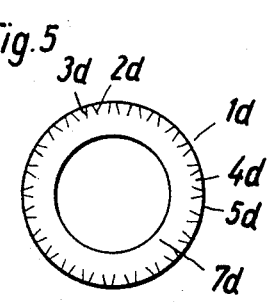

As will be seen from FIG. 5, the grooves 2d, 3d in the sliding surface 4d of the slide ring 1d may also alternately deviate in opposite direction from the radial direction, preferably by the same angle, so that, in conformity with FIG. 5, the grooves 2d, 3d extend to the outer circumference 5d in such a way that an inner groove-free annular zone 7d is formed.

Figure 6:
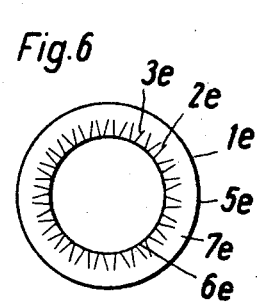

By arranging the grooves 2e, 3e in conformity with FIG. 6, a groove-free annular zone 7e is formed on the slide ring 1e between the outer circumference 5e and the annular zone formed by the grooves and extending to the inner circumference 6e.

Figure 7:
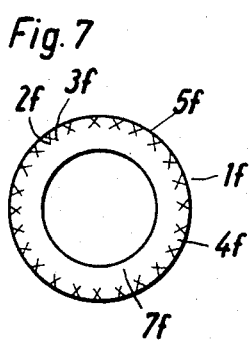

As shown in FIG. 7, the grooves 2f, 3f may be provided on the sliding surface 4f of the slide ring 1f in such a way that the grooves cross each other. In such an instance the arrangement is preferably such that always two grooves 2f, 3f cross each other within the central range of their length while with the illustrated embodiment all grooves 2f, 3f deviate from the radial course by about the same angle. As will be evident from FIG. 7, the grooves crossing each other, namely grooves 2f, 3f, extend to the outer circumference 5f so that an inner groove-free annular zone 7f is formed.

Figure 8:
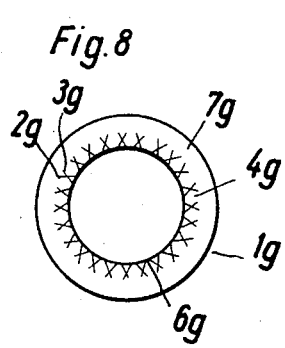

In contrast thereto, according to the embodiment of FIG. 8, the grooves 2g, 3g crossing each other are extended to the inner circumference 6g of the sliding surface 4g of the sealing ring 1g in such a manner that an outer groove-free annular zone 7g is formed.

Figure 9:
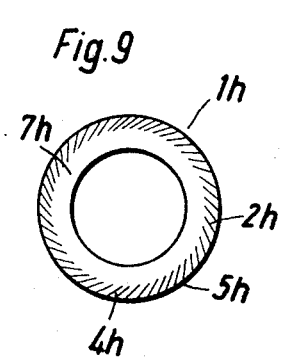

In conformity with FIG. 9, the grooves 2h may also be of different length. According to this embodiment, all grooves are provided so that they extend in the same direction while deviating from the radial direction, said grooves extending to the outer circumference 5h of the sliding surface 4h of the slide ring 1h. The radially inner ends of the grooves 2h are, however, located on a circle which is eccentrically located with regard to the central axis of the sliding surface 4h. This brings about that all grooves 2h will have a different length and that an inner groove-free zone 7h is formed which is eccentrically located with regard to the sliding surface 4h.

As will be evident from FIGS. 10 and 11, the grooves may also be arranged in the outer mantle surface. This arrangement has the advantage that the formation of a whirl is obtained by the medium to be sealed whereby dirt particles are centrifuged away from the area of the sliding surface. In addition thereto, the advantage is obtained that when the sliding surface wears, the effect of the grooves will be maintained so that the lubricating effect will be assured during the entire operational phase.

FIG. 12 shows the arrangement of the grooves in the inner mantle surface of the slide ring. This arrangement is advantageously selected when the medium to be sealed is located in the interior of the seal.

The sealing surface of the slide ring may also be formed by the combination of any two desired designs, for instance, in such a way that between an inner and outer zone provided with grooves there is arranged an intermediate groove-free annular zone 7i as shown in FIG. 13.

It is, of course, to be understood that the present invention also comprises combinations of the above structures so as to form a slide ring seal with a race ring and a counter race ring while the sliding surfaces of both rings are provided with grooves extending transverse to the circumference of said rings. Such ring is shown, for instance, in FIGS. 14, 14a and 14b, in which the rings 9 and 10 with grooves 9a and 10a respectively are composed to form the composite ring of FIG. 14.

While according to FIGS. 14–14b the grooves 9a and 10 a are of the same character, the grooves may also be of different character as shown in FIGS. 15, 15a and 15b in which the last mentioned grooves are designated with the reference numerals 7k and 7l respectively.

FIG. 16 illustrates a slight modification over FIG. 11 inasmuch as the grooves 2' of FIG. 11 have been replaced by grooves 2''' which latter, while being parallel to each other, form an angle with the horizontal plane passing through the axis 11 of ring 12.

Finally, FIG. 17 shows a slide ring 13 in which each two grooves 15, 16 on the periphery of the slide ring cross each other.

I claim:

1. An axially effective hydrodynamic-type slide ring for axially acting shaft sealing rings with as small a slide friction as possible for a good seal having a quiet operating relationship and a small leakage of the seal of the slide ring which has an outer circumferential surface an an inner circumferential surface and a side face extending radially from said inner circumferential surface to said outer circumferential surface to form a sliding surface of said ring, an annular area of said sliding surface adjacent said outer circumferential surface being provided with a multiplicity of pairs of circumferentially spaced grooves extending only to said outer circumferential surface and distributed over said annular area on said sliding surface, the grooves of each pair lying with spacing upon each other in the peripheral direction of the outer circumferential surface whereby the smooth sliding surface lying between the groove pairs intersecting with each groove at an angle to the radius at the point of intersection have a transition that is uninterrupted in the inner circumferential surface, more particularly said annular area being spaced from the inner circumferential surface to leave an annular groove-free zone of a circumferential, smooth, uninterrupted surface between said annular area and said inner circumferential surface, said smooth surface extending between said pairs of grooves to said outer circumferential surface, said grooves producing a back-feeding effect of the medium to be sealed.

2. An axially effective hydrodynamic-type slide ring according to claim 1, in which the grooves are small and extend predominantly radially with regard to the axis of said ring.

3. An axially effective hydrodynamic-type slide ring according to claim 1, in which the grooves are small and deviate from the radial direction and are inclined toward one side to said sliding surface circumferentially.

4. An axially effective hydrodynamic-type slide ring according to claim 1, in which the grooves are small and are arranged in pairs with the grooves of each pair extending in opposite inclined direction with regard to each other.

5. An axially effective hydrodynamic-type slide ring according to claim 1, in which the grooves are small and are arranged in pairs with the grooves of each pair crossing each other.

6. An axially effective hydrodynamic-type slide ring according to claim 1, in which the grooves are small and extend along a generated surface to the outer circumferential surface of the ring.

7. An axially effective hydrodynamic-type slide ring according to claim 1, in which said annular groove-free area being adjacent the outer circumferential surface of said ring.

8. An axially effective hydrodynamic-type slide ring according to claim 1, in which said annular groove-free area is adjacent the inner circumferential surface of said ring.

9. An axially effective hydrodynamic-type slide ring according to claim 1, in which the lengths of at least some of said grooves differing from each other.

10. An axially effective hydrodynamic-type slide ring according to claim 1, which comprises a lubricating substance at least partially filling said grooves.

11. An axially effective hydrodynamic-type slide ring according to claim 10, in which said lubricating substance is connected to said ring.

* * * * *